INVENTOR.
GENE UBERTI

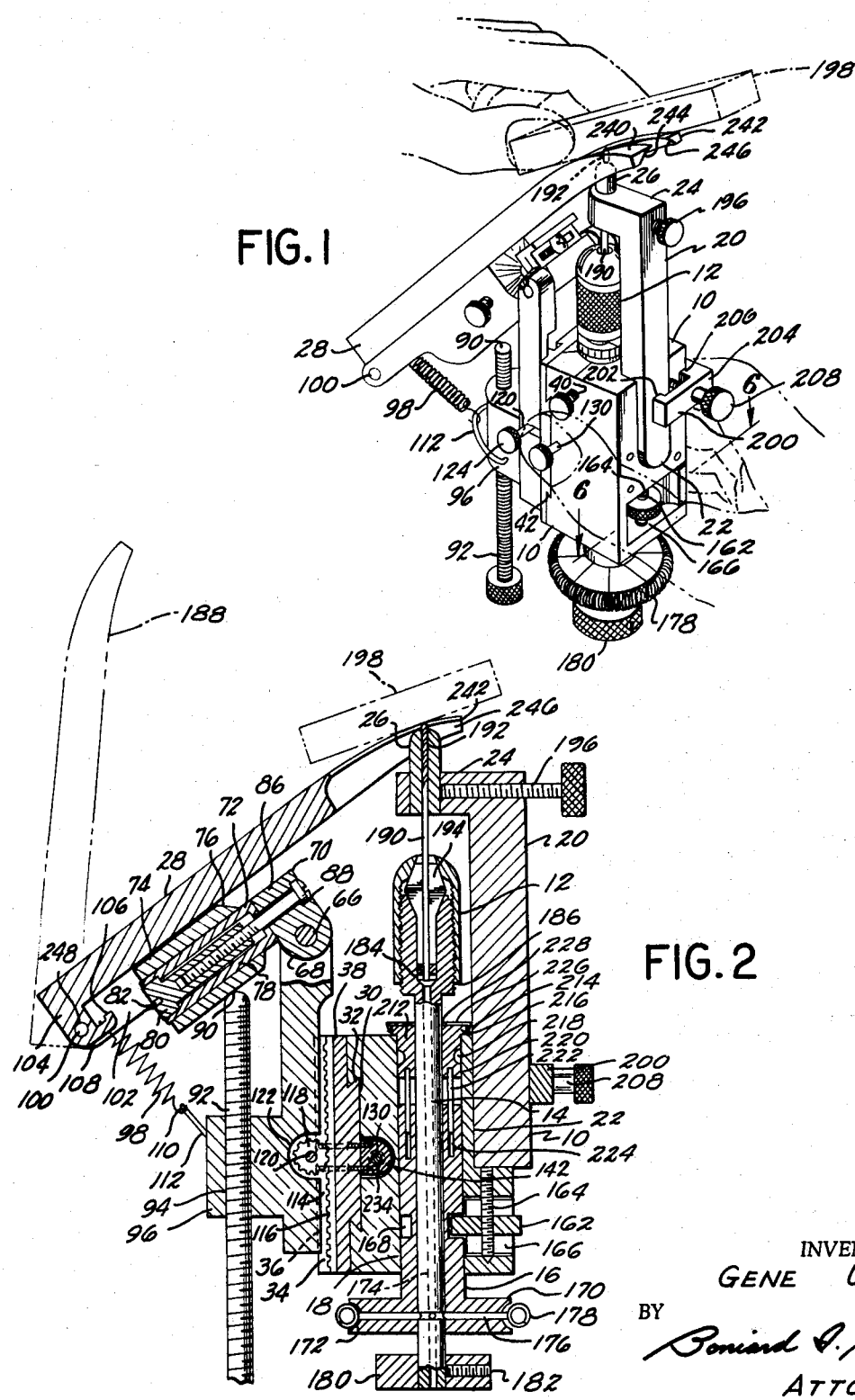

BY
Bernard L. Brown
ATTORNEY

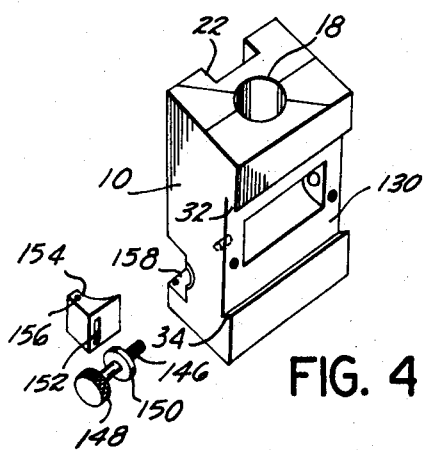
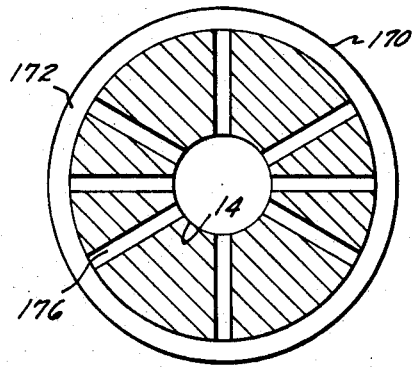
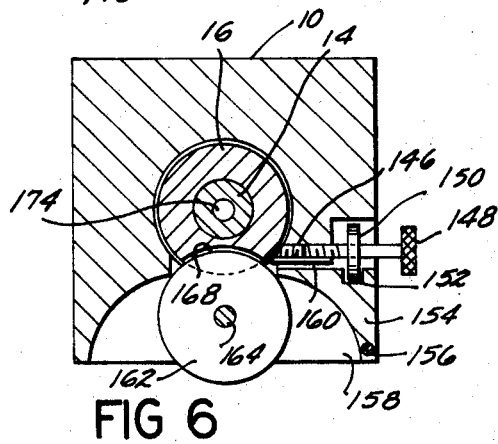
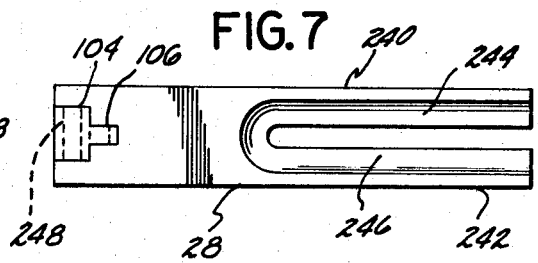

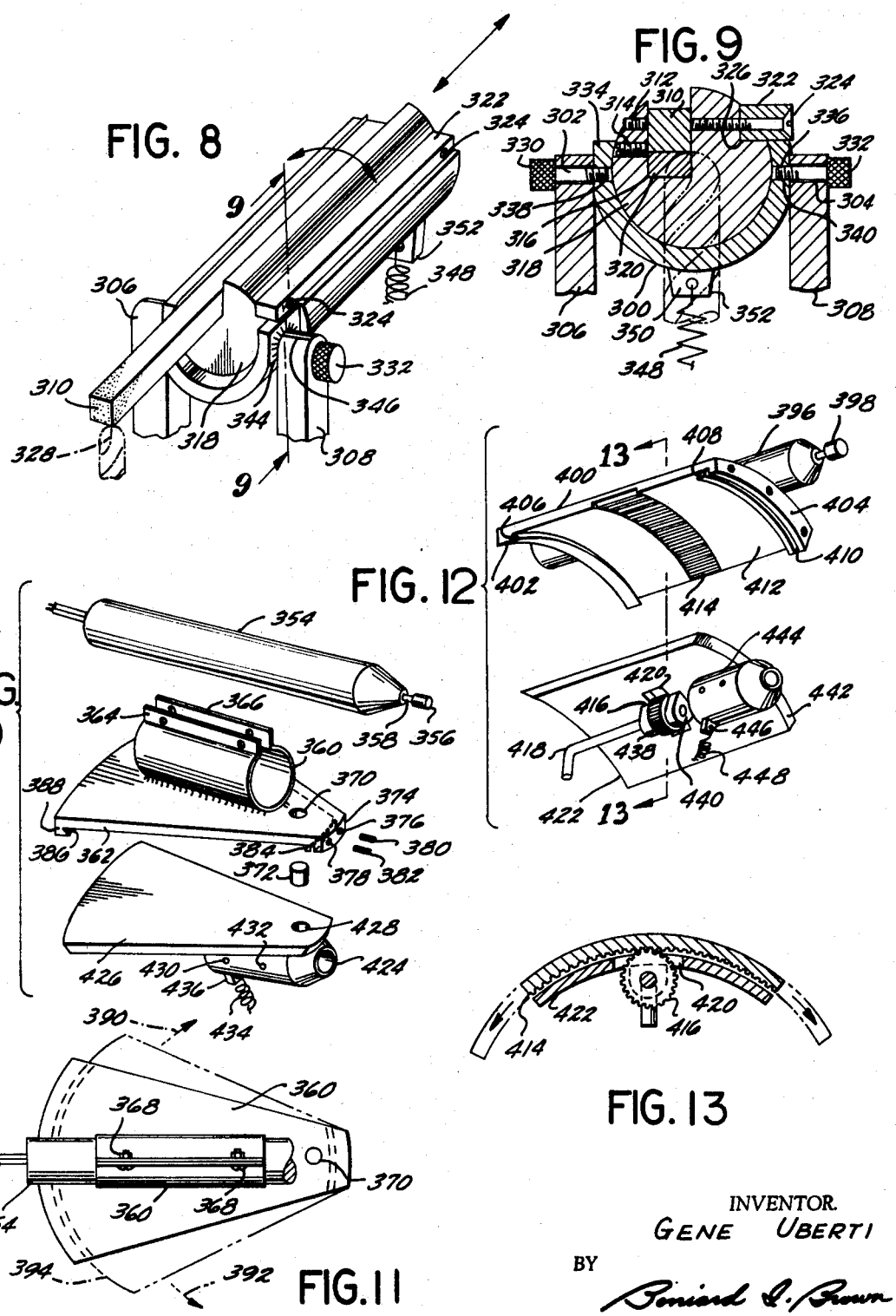

3,388,503
TOOL TIP SHARPENING DEVICE
Gene Uberti, Duarte, Calif.
(652 King St., Monrovia, Calif. 91016)
Filed Mar. 15, 1965, Ser. No. 439,675
9 Claims. (Cl. 51—33)

ABSTRACT OF THE DISCLOSURE

A tool tip sharpening jig having means for supporting a work tool to be sharpened in selected longitudinal and angular positions of adjustment along and about its axis, and means for supporting a sharpening tool in selected longitudinal, lateral, and angular positions of adjustment relative to the work tool.

The present invention relates generally to tool grinding and sharpening apparatus; more particularly, the invention relates to devices and jigs for sharpening or forming tips of tools adapted to be held in chucks.

Various machines and devices have heretofore been provided for sharpening and forming the tips of small tools, such as drills, cutters, scribes, and the like. These have been characterized by certain shortcomings and disadvantages. For example, because such tools are provided with relatively small shanks that require precision positioning means it is difficult to hold the tools to facilitate accurate grinding, sharpening and forming, particularly of the tips of such tools.

For this reason it is common practice in this art to discard a tool and provide a new tool, rather than sharpen the tool, particularly in the case of tools of small diameter. Most machinists and tool makers will discard small size drills instead of endeavoring to sharpen the drills because they are difficult to sharpen.

The apparatus and machines heretofore available for the sharpening and forming of such tool tips have generally been relatively extensive and complex. The availability of such machines has therefore been restricted, and their use avoided.

The present invention provides sharpening and forming device for drill bits, taps, dies, punches, scribes, dentists' tools, needles and the like, which may also be used for round end tools or tools with round, square, or hexagonal shanks, whereby it is less expensive to sharpen small tool tips than to discard them and purchase new tools.

The present invention contemplates a machine tool having a chuck adjustably mounted in a body with a stone guide adjustably mounted on the body, and with means for adjusting the position of the chuck whereby the tip of a tool held therein is accurately positioned in relation to a grinding stone manually held against the upper surface of the guide. The grinding or sharpening stone is positioned to slide on the stone guide. The chuck and other tool-retaining elements are adjustably mounted in a body. The chuck is vertically disposed and is carried on the upper end of a spindle mounted in a cylinder in a body having an L-shaped bracket with an arm in which a tool extended from the chuck is positioned, adjustably mounted thereon, and a sharpening stone guide with an arcuate bifurcated upper end pivotally mounted on said body and positioned whereby the manually actuated reciprocating stone traveling over an arcuate upper surface of the guide sharpens a tip of a tool held in said chuck. By utilizing a dividing head, equally spaced flat surfaces may be provided on the cutting tip of the tool, or flutes may be cut in the outer surface thereof. In the sharpening operation of a preferred embodiment of the invention, a stone guide having bifurcated jaws is positioned with the jaws straddling a tool tip, with the curved lower or inner surface of the guide resting upon the curved upper portion of an outer chuck member. With the parts in these positions a stone, held in a hand of an operator, is reciprocated over the upper arcuate surface of the stone guide engaging the tool tip.

In sharpening a tool which requires rotational indexing, such as the flutes of a drill, a lock screw is loosened, and the chuck assembly rotated until the cutting edges of the tool, or drill flutes, are parallel with the graduations on the upper end of the body. The lock screw is then tightened whereby only the indexing knob can be operated to bring the respective flutes in registry.

The present invention also provides means for thinning the web of a drill or other tool, which creates an extra cutting edge on each flute and relieves pressure while drilling. Without a thinned web the cutting edges of the flutes do not join at the center of the drill tip, and this provides a flat or blunt central portion on the end of the tip. This blunt central portion on the end of the tip increases the possibility of breakage, particularly of small drills, because the flat surface does not cut freely and consequently scrapes creating a resisting force which results in breakage.

For the forming of round end tool tips, the tip sharpening device of the invention utilizes a tool holder wherein a sharpening stone is clamped and which is adjusted and mounted in a generally semi-circular cradle on the upper portion of the device. In this application, the entire chuck assembly of the device is rotated to sharpen or form round tool tips, without interruption of the indexing elements which are used in other sharpening operations.

In modified forms of the invention, a motor-operated grinding wheel is utilized instead of the stone guide and associated parts hereinbefore mentioned. Motor mounting elements are substituted for the stone guide and associated parts, and an air or electric motor is utilized to power the grinding wheel.

It is therefore an object of the present invention to eliminate or alleviate the foregoing shortcomings of the prior art and to accomplish the foregoing purposes by the provision of a new and improved tool tip sharpening device.

An object of the invention is the provision of a tool tip sharpening and forming device which is particularly adapted to hold tools having shanks of relatively small diameters.

An object of this invention is to provide a tool tip sharpening device which may be adjusted to grind round end tools, and also flutes, in the surfaces of drills and the like.

It is an object of the invention to provide a sharpening and forming tool for drill bits, taps, dies, punches, scribes, dentists' tools, needles, and the like, and which may also be used for round end tools, or tools wth round, square, or hexagonal shanks, whereby it is less expensive to sharpen small tool tips than discard the tools and purchase new tools.

An object of the present invention is to provide a grinding and forming tool for small tools in combination with which a dividing head may be provided so that equally spaced flat surfaces and cutting edges may be obtained on the end of a tool such as a drill bit or reamer.

An object of the invention is the provision of a device or jig for sharpening or forming tips of tools, and particularly tools designed to be held in a chuck in which appropriate chuck collets can be provided for particular tool shanks.

Another object of the invention is to provide a sharpening and forming device for drills and the like of relatively small diameters in which means is provided for "thinning the web" of a drill or other tool to create an extra cutting edge on each flute and thereby relieve pressure while drilling.

Another object of the present invention is the provision of a machine for sharpening or forming the tip of a drill bit or the like, and particularly drill bits of small diameters, which machine is of simple and economical construction.

Other objects, features and advantages of the present invention will become apparent to those versed in the art from a consideration of the following description, the appended claims and the accompanying drawings, wherein:

FIGURE 1 is a perspective view illustrating the improved tool tip sharpener and former of the present invention, and showing a sharpening stone manually held on the upper surface of the stone guide, in broken lines;

FIGURE 2 is an elevational sectional view taken at line 2—2 of FIGURE 3, the parts being positioned substantially as shown in FIGURE 1;

FIGURE 4 is a perspective view of the body member of the tool tip sharpening device of FIGURES 1, 2 and 3, taken in the direction of the arrow 4 in FIGURE 3, together with a thumb screw and a locking dog;

FIGURE 5 is a sectional view taken at line 5—5 of FIGURE 3, showing the mounting of the coil spring for rotating the chuck of the device;

FIGURE 6 is a sectional plan view taken at line 6—6 of FIGURE 1, showing a knurled nut on a threaded stem for adjusting the elevation of the body, and also showing a locking dog for retaining the body in adjusted positions in the assembly;

FIGURE 7 is an elevational view taken at line 7—7 of FIGURE 3, showing the inner or under surface of the stone guide;

FIGURE 8 is a perspective view illustrating a modification wherein a sharpening stone is held by set screws in a slot of a cylinder in a cradle positioned above the body of the machine;

FIGURE 9 is a sectional view taken at line 9—9 in FIGURE 8, illustrating the relationships of the sharpening stone, a rounded tool tip, and cradle elements;

FIGURE 10 is an exploded perspective view of a motor and motor mounting assembly of a modified form of the tool tip sharpening device of the invention;

FIGURE 11 is a plan view of a motor mounting assembly and motor of FIGURE 10, showing relative pivotal movement of the parts during sharpening operation in phantom outline and by the directional arrows;

FIGURE 12 is an exploded perspective view of another form of motor-mounting assembly which may be utilized with the present invention to effect movement of a grinding wheel in an arc by means of an arcuate rack and associated pinion; and FIGURE 13 is a sectional view taken at line 13—13 of FIGURE 12, showing the rack-and-pinion components in assembled operative relation.

Figure 3:
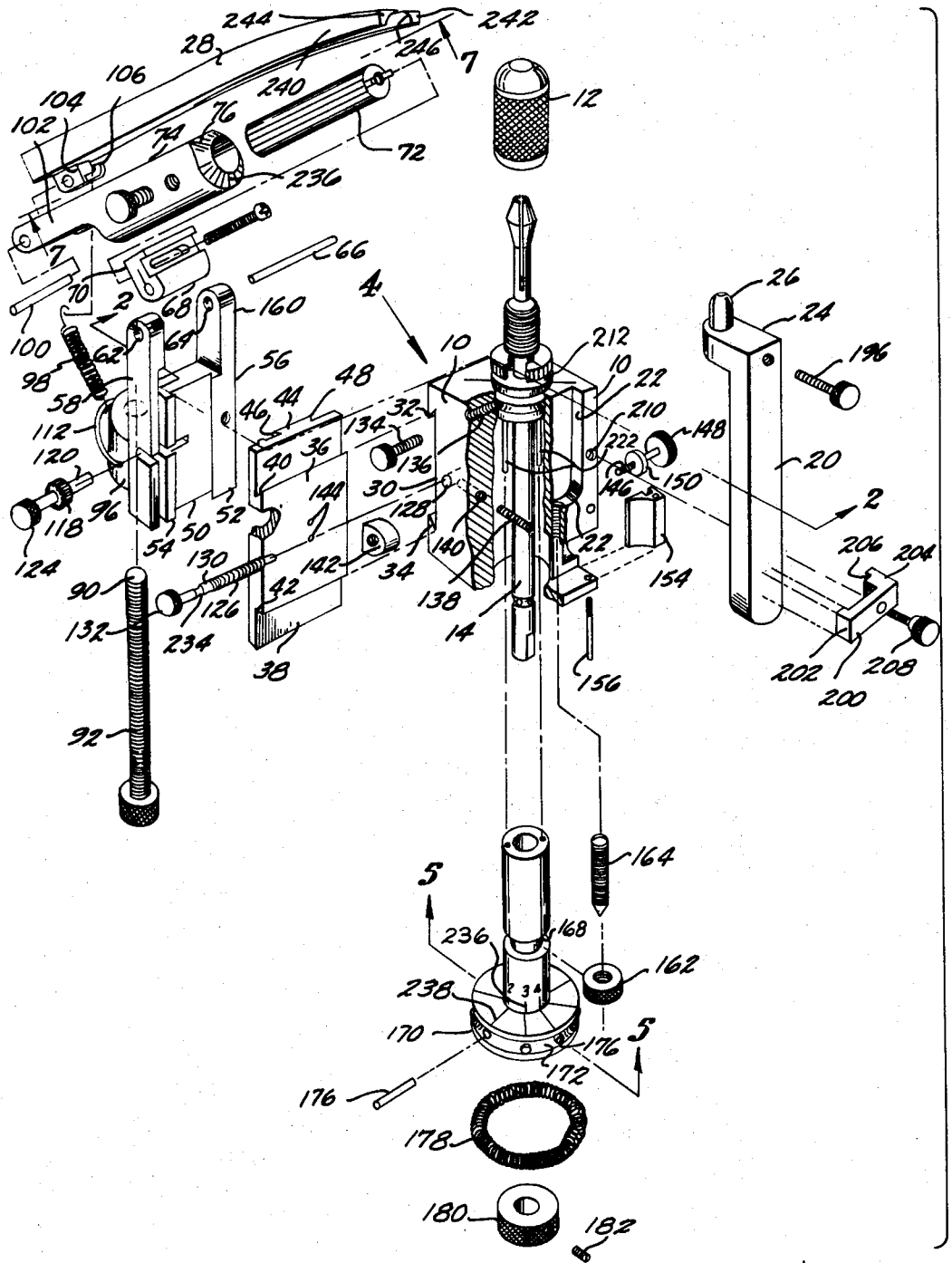
FIGURE 3 is an exploded perspective view of the tool tip sharpening device of FIGURES 1 and 2.

Referring to the drawings and particularly to FIGURES 1, 2 and 3, a preferred embodiment of the tool tip sharpening device of the invention is shown as comprising a block or body member 10, a clutch 12 on the upper end of a spindle 14 which is rotatably mounted in a sleeve 16 in an opening 18 in the block or body 10, numeral 20 indicating a bracket secured in a recess 22 in the body and having an arm 24, with a tool holding bushing 26 therein extended from the upper end, and numeral 28 indicating a sharpening stone guide having an arcuate upper surface on which a sharpening stone is reciprocated in sharpening a tool.

The rear of the body 10 is provided with a horizontally disposed recess 30 having beveled upper and lower edges 32 and 34, respectively, and a tongue 36 of a slider 38 is positioned in the recess. The tongue 36 is provided with beveled edges 40, 42 corresponding with the edges 32 and 34. The slider 38 is provided with a vertically disposed tongue 44, having beveled edges 46 and 48, and the tongue 44 nests in a slot 50, also having beveled edges 52 and 54, of a yoke 56 having upwardly extended arms 58 and 60, as shown in FIGURE 3. The upper ends of the arms 58 and 60 are provided with openings 62, 64 in which a pin 66 is positioned. The pin extends through a hub 68 of a bearing 70 from which a bushing 72 extends.

As shown in FIGURE 2, the bushing 72 is provided with an outer sleeve 74 having a beveled upper end 76, and the bushing extends over a tube 78 having a head 80 with a screwdriver slot 82 in its lower end. The tube 78 is threaded internally to receive a screw 84 extended through the bearing 70, the opening 86 for the screw having a counterbore 88 in the outer end. Downward movement of the sharpening stone guide 28 is limited by a stop provided by a round surface 90 on the upper end of a screw 92 threaded in an opening 94 in a block 96. The guide is resiliently held against the stop by a spring 98 and the lower end of the guide is pivotally mounted by means of a pin 100 in arms 102 which extend from the sleeve 74. The pin 100 extends through a web 104 in the lower end of the guide, and the web is provided with a hook 106 by which the upper end 108 of the spring 98 is held. The lower end 110 of the spring is held by a ring or bail 112 extended from the block 96 in which the screw 92 is threaded.

The yoke 56 is provided with a vertically disposed slot 114 which is in registering relation with a gear rack 116 in the slider 38. The gear rack meshes with a pinion 118 on a pin 120, which is rotatably mounted in an opening 122. The outer end of the pin 120 is provided with a knurled head or knob 124 by which the pin 120 and pinion 118 are manually rotated to raise and lower the yoke and stone guide in relation to the body 10.

Referring to FIGURE 3, the body is provided with a worm 126 rotatably mounted in an opening 128 in the body; the outer end of the worm, which is rotatably mounted by a shaft 130 in the body, is provided with a knurled head or knob 132. Upon rotation of the pin 120 by the knob 124 the pinion 118 raises or lowers the yoke and stone guide, and upon rotation of the worm 126 by the knob 132 the slider, yoke, and stone guide are moved transversely or horizontally. A set screw 134 is threaded in an opening 136 of the body to prevent rotation of the chuck body. The body is also provided with a lock screw 138 threaded in an opening 140 in the body 10, for retaining the worm in adjusted positions. The intermediate part of the worm is supported by an internally threaded bearing 142 that is secured on the slider 38 by screws extending through openings 144 in the tongue 36.

As shown in FIGURES 3, 4 and 6, the body is provided with a locking arrangement for height adjustment including a screw 146 having a knob 148 on the outer end. The screw is provided with a disc 150 that coacts with a notch 152 in a pivotable segment 154 which is pivotally mounted on a pin 156 in a recess 158 of the body. From the geometry of the parts and from the drawings, it will be understood that upon the turning of the screw by means of knob 148, the segment 154 is actuated to bear against a knurled disc 162, which is threaded on a screw 164, to effect frictional locking of the spindle in adjusted vertically disposed position in the body. Knurled disc 162 serves to adjust the vertical position of the body, and is positioned in a recess 166 and extends into an annular groove 168 in sleeve 16, as shown in FIGURE 2. The lower end of the sleeve 16 is provided with a disc 170 having an annular groove 172 in the outer surface, and the groove 172 is in communication with a center opening 174 of the spindle 14 through radially disposed passages 176. An endless spring 178 is provided in the groove 172 to provide a means for manual gripping. The lower end of the spindle 14 is provided with a knurled disc 180, which is secured in place by a set screw 182.

The center opening 174 of the spindle 14 extends into the clutch 12. A valve 184, which coacts with a valve seat 186 in the clutch, is positioned at the upper end of the opening.

To position a tool in the sharpening device preparatory to the sharpening operation, with the stone guide 28 in the inoperative position indicated by the broken lines 188 in FIGURE 2, the shank 190 of a tool 192 is inserted in the jaws 194 of the clutch 12 with the cutting end of the tool in the bushing 26. The position of the bushing 26 in relation to the tool to be sharpened is adjusted by loosening the thumb screw 196. With the tool in position the stone guide is returned to the position shown in full lines in FIGURE 2. The bracket 20 is secured in the recess 22 by a clamp 200, the inner end 202 of which bears against the face of the bracket, and the outer end 204 of which is provided with a notch 206 in which the outer corner of the body 10 is positioned. The clamp is secured in position by a screw 208 which is threaded in an opening 210 in the body.

In the sharpening operation, with the parts assembled as illustrated and described and with the drill bit or other tool positioned in jaws 194 of chuck 12, guide 28 being positioned as shown in FIGURE 2, with the cutting end of the tip extending through bushing 26, the sharpening stone 198 is manually reciprocated over the guide to sharpen the tool tip.

For use in sharpening operations requiring rotational indexing, a head 212 is provided in the upper end of the opening 18 through the body. As shown in FIGURE 2, a friction sleeve 226 having a depending flange 214 is positioned on a flange 216 on the upper end of the head. The outer surface of the head is provided with an annular groove 218 and the lower end is provided with spaced openings 220 that are positioned to receive upper ends of pins 222, the lower ends of which are positioned in openings 224 in the upper end of the sleeve 16. The outside diameter of the friction sleeve, which is indicated by the numeral 226, is such that the friction sleeve clears the inner surface of the bracket 20 to permit the friction sleeve to rotate freely. Clearance is also provided between the wall of the opening 228 in the center of the friction sleeve and the outer surface of the spindle 14 which also permits the friction sleeve to rotate on the flange 216. The central opening in the friction sleeve is sufficiently large that the sleeve clears the shank about which it is positioned, and does not interfere with the operation of the indexing assembly.

As shown in FIGURE 3, the end surface 76 of the sleeve 74 is provided with graduations 236 to facilitate setting the sharpening stone guide, and other graduations 238 are provided on the disc 170 to facilitate setting the collets and flutes to correspond with similar elements of a drill bit.

In the sharpening of a tool which requires rotational indexing, such as the flutes of a drill, the lock screw 40 is loosened and the chuck assembly is rotated until the cutting edges of the tool, such as drill flutes, are parallel with the graduations of the upper end of the body. The lock screw is then tightened, so that only the indexing knob 180 can be operated to bring the respective flutes in registry. The tool tip may be rotated to correspond with the sides of a tool, or flutes of a drill, and the stone guide may be positioned in relation to the chuck assembly by actuating slider 38 vertically or yoke 56 vertically. The spindle and chuck may be rotated to correspond with the radially disposed openings 176 of wheel 170, as shown in FIGURE 5.

The outer end of the sharpening stone guide 28 is bifurcated providing fingers 240 and 242 which are arcuate in side elevation, and the inner edges of the fingers are provided with arcuate surfaces 244 and 246, as shown in FIGURES 3 and 7. The web 104, which is provided with an opening 248 for the pin 100 depends from the opposite end providing a hinge joint which permits the stone guide to swing open to the position indicated by the broken lines 188 in FIGURE 2, when removing and replacing tools or tool bits in the chuck.

FIGURES 8 and 9 illustrate a modification utilized in the finishing of the tips of round end tools. A substantially semi-circular shell 300 provides a cradle and the cradle is suspended by trunnions 302 and 304 in arms 306 and 308 of a yoke, similar to the yoke 56, and a sharpening stone 310 is secured by screws 312 and 314 in a slot 316 in a cylinder 318 with a shim 320 below the stone. The cylinder is retained in position in the cradle by a key 322 which is secured by screws 324 in a notch 326 in the cylinder. The thickness of the shim 320, one half the diameter of the tool, is such that the lower surface of the stone 310 engages the tip 328 of a tool. The trunnions are formed with the studs having heads 330 and 332, and threaded ends 334 and 336 which are threaded in openings 338 and 340 in the side walls of the cradle. By this means the stone may be pivoted on the axes of the trunnions to correspond with the rounded surface of the tool bit. One side of the cradle is provided with a projection 342 on which graduations 344 are positioned, and the arm 308 of the yoke is provided with a reference line 346 positioned to register with the graduations to facilitate setting the sharpening stone in relation to the drill bit. The opposite end of the cradle is urged downwardly by a spring 348, the upper end 350 of which is connected to a depending tab 352 on the upper end of the cradle.

By swinging the cradle in a vertically disposed plane, the sharpening stone 310 may be actuated to finish the rounded tip 328 of a tool. By locking the components with an adjusting knob, the entire chuck assembly rotates during the sharpening of a round tool tip, without interruption of the indexing elements hereinbefore described.

FIGURES 10 through 13 illustrate motor-mounting assemblies for air or electric motors, the motor-mounting assemblies being substituted for the stone guide 28 and associated parts, hereinbefore described, for the operation of grinding wheels to perform the tip forming operations, instead of the sharpening stones hereinbefore mentioned. One embodiment or type of motor-mounting assembly is illustrated in FIGURES 10 and 11, and another embodiment or type is illustrated in FIGURES 12 and 13.

Referring to FIGURES 10 and 11, an electric motor 354 is provided with a grinding wheel 356 on a shaft 358 thereof. The motor is mounted by means of a clamp 360 on a segment 362, as shown. The clamp 360 is provided with flanges 364 and 366 and the cylindrical portion thereof is retained in gripping relation with the motor by bolts 368 which extend through the flanges. The segment 362 is provided with an opening 370 in which a pivot pin 372 is positioned, and a flange 374 depending from the small end is provided with internally threaded openings 376 and 378 for set screws 380 and 382, respectively, for retaining the segment in adjusted positions. The inside of the flange 374 is provided with a beveled surface 384 and a similar beveled surface 386 is provided on the inside of a flange 388 at the opposite end of the segment. By this means the segment is free to swing laterally, as indicated by the arrows 390 and 392 on a surface as indicated by the broken lines 394. The sleeve 424 of FIGURE 10 corresponds in function to the outer sleeve 74 of the embodiment shown in FIGURE 2, and the bushing 72 of FIGURE 2 engages the sleeve 424 when the motor-mounting assembly of FIGURES 10 and 11 is utilized. The spring 434 is similar in function to the spring 98 of FIGURES 1, 2 and 3.

From the foregoing description and the drawing, it will be understood that by swinging the motor 354 and grinding wheel 356 by means of the motor-mounting assembly, as indicated by the arrows 390, 392 of FIGURE 11, movement of the grinding wheel 356 can be controlled to effect finishing of a tool tip held in the chuck of the sharpening device.

Referring to FIGURES 12 and 13, the motor-mounting assembly therein described mounts a motor 396 having a grinding wheel 398 on an arcuate plate 400. The arcuate plate 400 has flanges 402 and 404 with beveled inner surfaces 406, 408 at the ends. Flange 404 is provided with a slot 410. The under surface 412 of the plate 400 is provided with a gear rack 414 that is positioned to mesh with a gear, such as the gear 416 in FIGURE 12, in which the gear is provided with a handle 418, so that the motor is readily movable laterally in operation. The gear, as indicated by the numeral 416, extends through an opening 420 in an arcuate plate 422 and meshes with the gear rack 414, as shown in FIGURE 13. The sleeve 444 is like sleeve 424 of FIGURE 10, and is similar in function to outer sleeve 74 of FIGURES 1, 2 and 3.

In performing a tool tip sharpening operation utilizing the motor-mounting assembly of FIGURES 12 and 13, the grinding wheel is moved or reciprocated in an arc by means of the arcuate rack and manually operated pinion gear.

Those skilled in the art will appreciate that the present invention achieves the objects and realizes the advantages hereinbefore mentioned. An extraordinary effective tool tip sharpener is provided.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. A tool tip sharpener comprising a body, a tool carrying chuck mounted to travel vertically in said body, and tool support means mounted on the body for linear adjustment along a first direction line parallel to the axis of said chuck and a second direction line normal to said first direction line, and angular adjustment about a pivot axis parallel to said second direction line and operatively positioned in relation to said chuck, whereby a sharpening element thereon engages the tip of a tool in said chuck.

2. A tool tip sharpener comprising a body, a tool-carrying chuck mounted to travel vertically in said body, and a sharpening stone guide mounted on said body for linear adjustment along a first direction line parallel to the axis of said chuck, a second direction line normal to said first direction line, and angular adjustment about a pivot axis parallel to said second direction line and operatively positioned in relation to said chuck, a sharpening stone holder supported on said guide for oscillation and reciprocation along an axis normal to said pivot axis, and said holder, having means for supporting a sharpening stone in generally parallel laterally offset relation to said axis of oscillation and reciprocation, whereby a stone may be oscillated and reciprocated on said guide while engaging the tip of a tool in said chuck.

3. A tool tip sharpener comprising a mounting body, a spindle mounted to move vertically in said body, a tool-holding chuck carried on the upper end portion of the spindle, a sharpening stone guide mounted on said body for linear adjustment along a first direction line parallel to the axis of said spindle and a second direction line normal to said first direction line, and angular adjustment about a pivot axis parallel to said second direction line and positioned to coact with said chuck, fingers of said guide straddling a tool tip in said chuck, and means for turning said tool tip to positions corresponding with flutes of said tool tip.

4. A tool tip sharpener comprising a body, a spindle mounted to move axially in said body, a sleeve rotatably mounted in the body and having the spindle rotatably mounted therein, a tool-holding chuck positioned on the upper end portion of the spindle, a slider slidably mounted on the body and positioned to travel along a first direction line normal to the spindle axis, a yoke slidably mounted on said slider to travel parallel to said axis, a stone guide pivotally mounted on said yoke on an axis parallel to said direction line and positioned to coact with a tool extending from said chuck, and means for manually turning said chuck and tool tip to positions corresponding with flutes of said tool.

5. In a tool tip sharpener, the combination comprising a body having a vertically disposed cylindrical opening extending therethrough, a sleeve positioned in said cylindrical opening and having gripping means on its lower end portion, a spindle extending through the sleeve and having a knurled knob on its lower end portion, a chuck on the upper end of the spindle, a bracket carried by the body and extending upwardly therefrom, an arm having a bushing therein extended laterally from the upper end portion of the bracket, a slider mounted to slide horizontally in one side of the body, a yoke carried by the slider and positioned to slide vertically thereon, a stone guide positioned to straddle a tool extending from the chuck, and means pivotally mounting the stone guide in the yoke.

6. In a tool tip sharpener, the combination comprising a rectangular-shaped body having a vertically disposed cylindrical opening extending therethrough, a sleeve positioned in said cylindrical opening of the body and having a gripping disk at its lower end, a spindle extending through said sleeve and having a knurled knob on its lower end portion, an L-shaped bracket mounted in a recess of the body and having an arm extending from its upper end, a chuck carried by the spindle and positioned between the spindle and said arm of the bracket, a tool-retaining bushing in the extending end of said arm, said bushing, chuck, and spindle being in alignment, a slider mounted on the body and arranged to travel transversely thereof, a yoke carried by the slider and arranged to travel vertically thereon, an adjusting element pivotally mounted on said yoke, a stone guide pivotally mounted on said adjusting element and having a bifurcated upper end portion positioned to straddle said bushing, an adjusting screw for regulating the position of the bracket in the body, and a clamp for retaining the bracket in adjusted positions in said body.

7. A tool tip sharpener according to claim 6, and further including resilient means urging said upper end portion of said stone guide against said tool-retaining bushing.

8. A tool tip sharpener comprising a body, a spindle mounted to be actuated vertically in said body, a sleeve rotatably mounted in the body and having the spindle rotatably mounted therein, a tool-holding chuck positioned on the upper end portion of the spindle, a slider slidably mounted on the body and positioned to travel transversely thereof, a yoke slidably mounted on said slider and positioned to travel vertically thereon, motor means pivotally mounted on said yoke and powering a grinding wheel positioned to coact with a tool extending from said chuck, and means for manually turning said chuck and tool.

9. In a tool tip sharpener, the combination comprising a rectangular-shaped body having a vertically disposed cylindrical opening extending therethrough, a sleeve positioned in said cylindrical opening of the body and having a gripping disk at its lower end, a spindle extending through said sleeve and having a knurled knob on its lower end portion, and an L-shaped bracket mounted in a recess of the body and having an arm extending from its upper end, a chuck carried by the spindle and positioned between the spindle and said arm of the bracket, a tool-retaining bushing in the extending end of said arm, said bushing, chuck, and spindle being in alignment, a slider mounted on the body and arranged to travel transversely thereof, a yoke carried by the slider and arranged to travel vertically thereon, an adjusting element pivotally mounted on said yoke, motor means pivotally mounted on said yoke and powering a grinding wheel positioned to coact with a tool in said chuck, an adjusting screw for regulating the position of the bracket in the body, and a clamp for retaining the bracket in adjusted positions in said body.

References Cited

UNITED STATES PATENTS 2,144,095   1/1939   Zwick _____ 51—124

HAROLD D. WHITEHEAD, *Primary Examiner.*